United States Patent [19]
Thomson

[11] 4,107,830
[45] Aug. 22, 1978

[54] ROLLING PIN CONSTRUCTION

[76] Inventor: George V. Thomson, 4400 Golden Valley Rd., Minneapolis, Minn. 55422

[21] Appl. No.: 807,356

[22] Filed: Jun. 17, 1977

Related U.S. Application Data

[63] Continuation-in-part of Ser. No. 792,544, May 2, 1977, abandoned.

[51] Int. Cl.² ............................................. A47J 43/04
[52] U.S. Cl. .................................................. 29/110.5
[58] Field of Search ....................... 29/110.5; 425/374; 269/302.1

[56] References Cited

U.S. PATENT DOCUMENTS

| | | | |
|---|---|---|---|
| 1,323,410 | 12/1919 | Sams | 29/110.5 |
| 2,633,815 | 4/1953 | Duskey | 29/110.5 |
| 3,157,135 | 11/1964 | Fetrow et al. | 29/110.5 |

*Primary Examiner*—Werner H. Schroeder
*Attorney, Agent, or Firm*—Merchant, Gould, Smith, Edell, Welter & Schmidt

[57] ABSTRACT

A pastry roller which is terete rather than cylindrical in outline, being of greater diameter centrally than at its ends, so that its configuration from end to end comprises a smooth convex curved surface, the curvature of which need not be everywhere the same.

4 Claims, 6 Drawing Figures

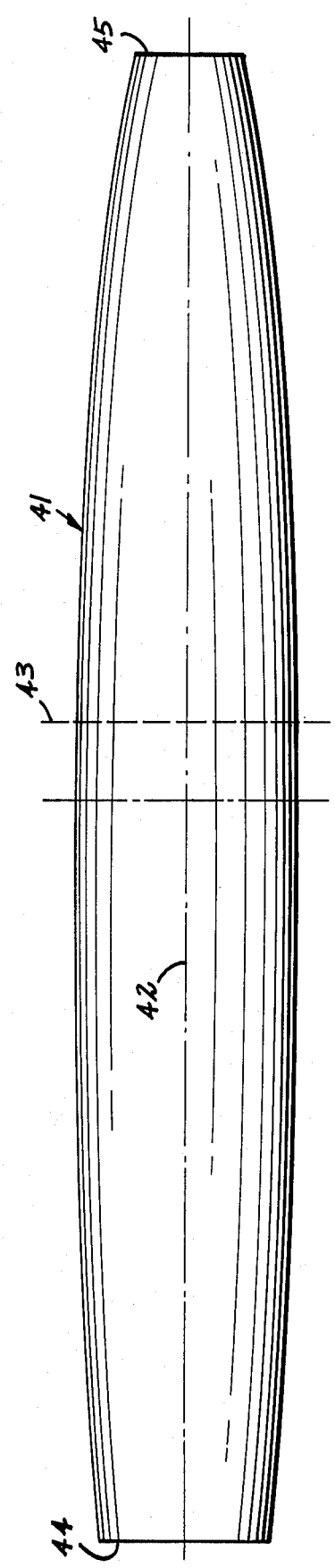

ROLLING PIN CONSTRUCTION

This application is a continuation-in-part of my co-pending application, Ser. No. 792,544, filed May 2, 1977, entitled "ROLLING PIN CONSTRUCTION", now abandoned.

BACKGROUND OF THE INVENTION

In the art of cookery the making of pastry for the upper and lower crusts of pies is an ancient skill and one practiced by almost all housewives. A mann of properly prepared dough is placed on a floured flat surface and thinned by rolling pressure applied in strokes directed radially outwardly in many directions, the mass of dough being thereby converted to an approximately circular thin sheet. With acquired skill, the cook is able to select an initial quantity of dough which can be rolled out to a crust of proper thickness and of generally circular outline slightly larger than a pie pan. The process is accomplished using a cylindrical rolling pin a few inches in diameter, and longer than the diameter of the pie pan.

The rolling of pastry crust is in fact an accelerated flow procedure, the dough acting as a plastic or extremely viscous and somewhat elastic liquid. A wide range of doughs is known, from very rich pastry doughs to self-rising and yeast doughs. Each stroke of the rolling pin causes a "wave" of dough to move outwardly ahead of the roller. A shearing force develops between the dough being moved at each end of the roller and the adjacent masses of dough, and after the crust has reached some degree of thinness these shearing forces tend to produce thin spots in the crust. A skillful cook almost unconsciously varies the pressure of the roller against the dough at different locations in the rolling stroke, and also continuously varies the radial direction of the stroke, to mitigate this problem.

SUMMARY OF THE INVENTION

Applicant has designed a pastry roller adapted to facilitate the rolling of smooth, even, regular pastry crust. In his new device, the rigid roller is not a true cylinder, but is an elongated, terete body having a diameter which varies, being least at its ends and greater therebetween, so that in a plane passing through the axis of the roller its active surface defines smooth convex curves. From this arrangement it follows that for any given downward force applied to the roller as a whole the pressure on the dough is greatest along the center line of the stroke, and less at locations laterally spaced therefrom. The "wave" of dough moving ahead of the roller now has a component of motion transverse to the center line, reducing the shear forces at the ends of the roller and thus conducing to the production of an even crust.

It is well known that doughs of different compositions have different physical characteristics, and applicant believes that for each dough there is a preferred curvature for the surface of a rolling pin. Applicant has designed a roller having two different curvatures merging smoothly to give a single convex surface. The user can then tilt the roller slightly in one direction or the other according as he prefers a sharper or flatter curvature for the dough on hand.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWINGS

In the drawing,

FIG. 6 shows an embodiment of the invention having different curvatures smoothly merging together.

DESCRIPTION OF THE PREFERRED EMBODIMENTS

Figure 1:
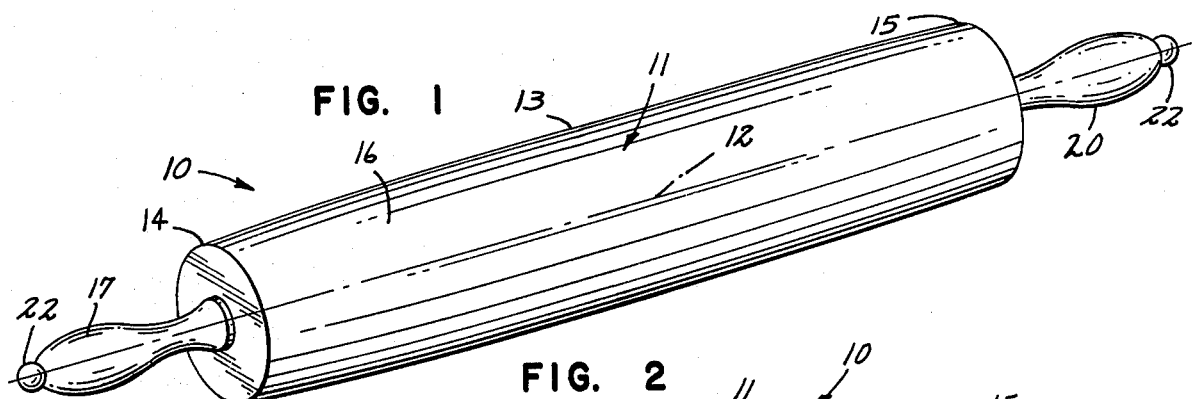
FIG. 1, is a perspective view of one embodiment of the invention.
Figure 2:
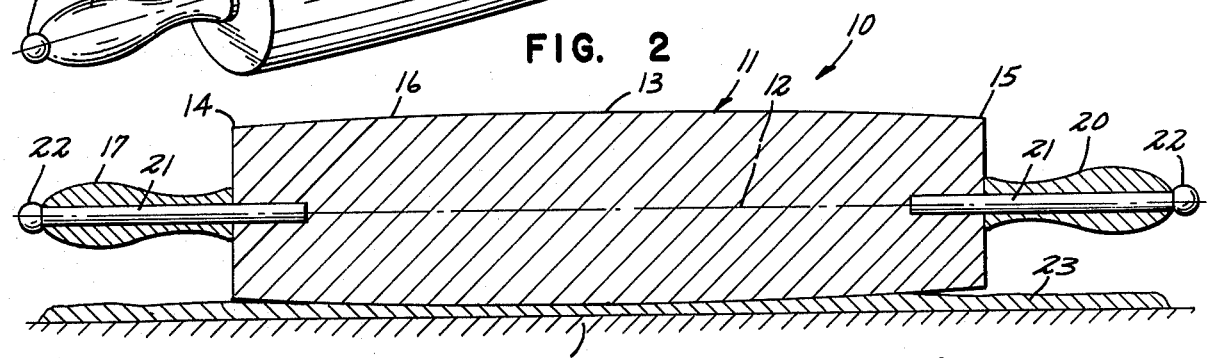
FIG. 2 is an axial section of that embodiment of the invention in use.

A rolling pin or pastry roller 10 according to the invention is shown in FIGS. 1 and 2 to comprise a rigid, elongated, terete body 11 having a longitudinal axis 12. Body 11 is not truly cylindrical, although its transverse section anywhere along axis 12 is circular. The diameter of body 11 is greatest at or near its center 13, and least at its ends 14 and 15: the body is configured so that for any axial section each edge defines a smooth convex curve 16. A pair of handles 17 and 20, are freely rotatable on pegs 21 secured axially into body 11, and are retained in place by knobs 22 at the ends of the pegs. If desired the handles may be fixed to the roller.

As shown in FIG. 2 the utensil is used to roll out a crust of dough 23 on a suitable flat pastry board 19. It will be evident from FIG. 2 that the roller exerts its maximum force on the dough at its center 13: for light applied pressure the ends of the body may not even contact the dough at all.

Figure 3:
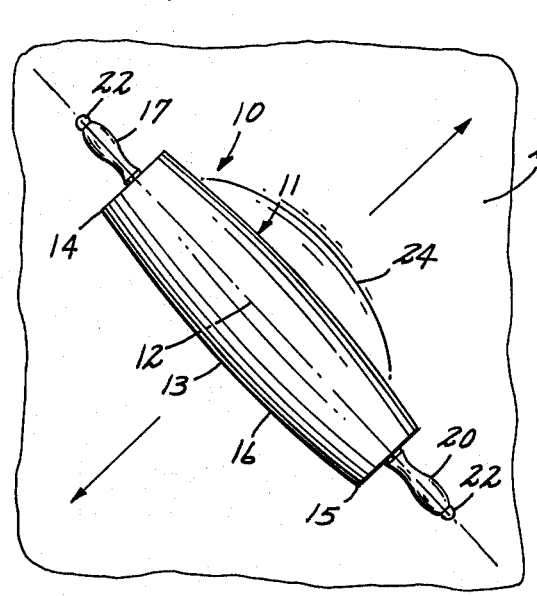
FIGS. 3 and 4 are diagrams indicative of the use of the invention.

As FIG. 3 suggests, a "wave" 24 of dough precedes the roller as it moves across the dough, in a direction generally perpendicular to its longitudinal axis. Contrary to the condition with a cylindrical roller, this wave does not terminate in sharp curves at the ends of the roller but merges gradually into the mass beneath the roller somewhere near its ends. The successive strokes of the roller have different directions, as indicated by the radial arrows 25 FIG. 4, to spread the intial body of dough into a larger, thinner, generally circular layer of crust.

Figure 4:
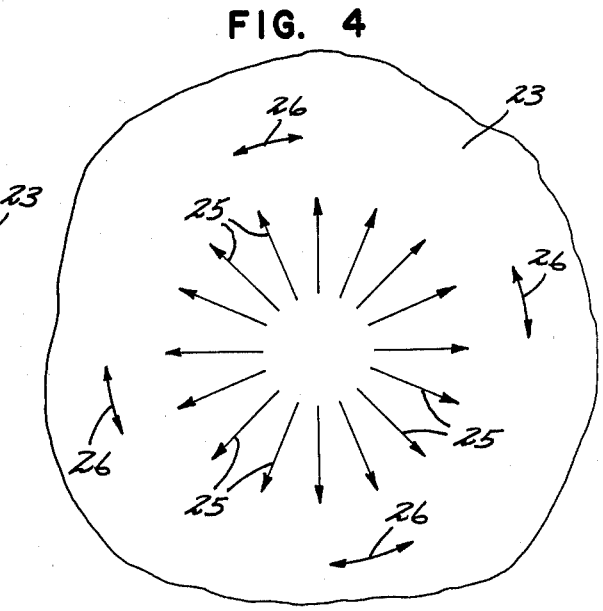

At times it is desirable to move the roller in a generally peripheral direction with respect to the mass of dough, as indicated by the arrows 26 of FIG. 4. The special configuration of my roller is advantageous here as well, causing plastic flow of the dough without introducing undesirably great internal shear to give localized weakening.

In one successful exemplar of this embodiment of the invention the body 11 was 10 inches long, 2½ inches in diameter at its center, and 1½ inches in diameter at its end so that the convexity of the roller had a radius of about 50 inches. This radius may vary in a range between 4 and 15 feet.

Figure 5:
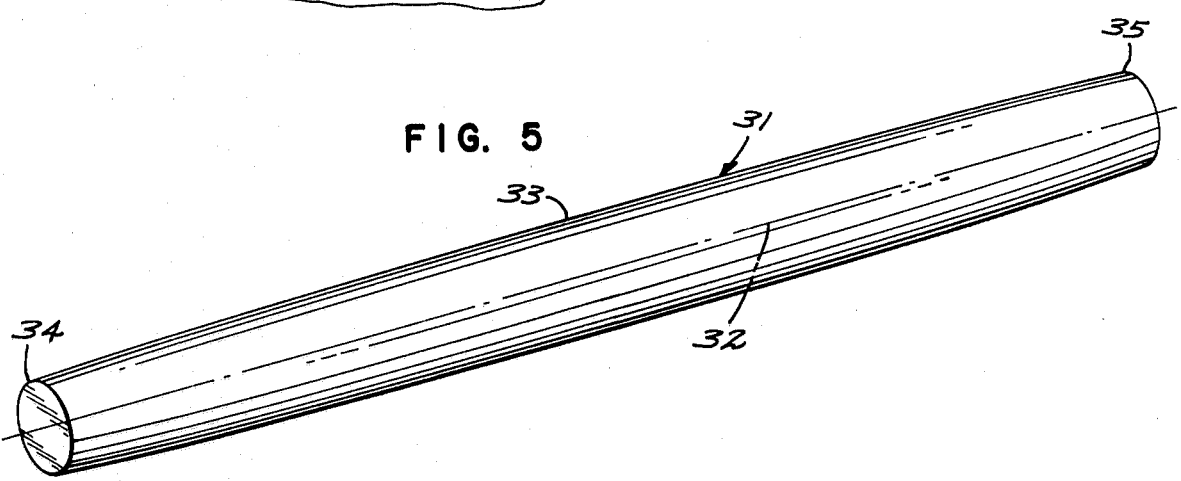
FIG. 5 is a perspective view of a second embodiment of the invention.

A second embodiment of the invention is shown in FIG. 5. Here the roller is without handles, and is longer and more slender than the first embodiment. It consists of a rigid, elongated, terete body 31 having a longitudinal axis 32 and configured so that its transverse section anywhere along the axis is circular. The diameter of body 31 is greatest at its center 33 and least at its ends 34 and 35. In one successful exemplar of this embodiment, the body was 15½ inches long, 1½ inches in diameter centrally, and 1¼ inches in diameter at its ends, so that the convexity of the roller had a radius of about 60 inches. The smaller roller is easier to use and more maneuverable, as well as being advantageous with doughs of more elastic nature.

The utensil in this embodiment is applied to and works the dough in the same fashion as previously described; it is intended for users who prefer to dispense with the rotary handles of the first embodiment.

A third embodiment of the invention is shown in FIG. 6. Here the roller is again without handles. It comprises a rigid elongated terete body 41 having a longitudinal axis 42 and configured so that its transverse section anywhere along the axis is circular. The diameter of body 41 is greatest at a site 43 which is not midway between a large end 44 and a small end 45. The curvature of the small end is very appreciably sharper than that at the large end, although the curves blend imperceptibly at a common tangent to give a single smooth surface. In one successful exemplar of this embodiment the body was 14½ inches long, 1 1/16 inches in diameter at the small end, 1 11/16 inches in diameter at the large end, and 2 3/16 inches in diameter at its largest point, which was 8 inches from the larger end. The radius of curvature at the smaller end was about 43 inches, and that at the larger end was about 127 inches.

By slightly tilting the roller in one direction or the other the user can choose between two alternative curvatures as he feels his dough requires.

From the foregoing, it will be evident that I have invented a new and useful pastry roller, suitable for use with various doughs including nonfood doughs, which is terete rather than truly cylindrical, having a diameter which is greatest toward its center and least at its ends, and need not be of a single curvature, together with a new and useful method of pastry crust preparation facilitated by the new structure.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A pastry roller consisting a rigid, elongated, terete body having a longitudinal axis, the diameter of said body being less at its ends than therebetween so that in a plane passing through said axis the edges of said body form smooth curves having greater curvature at one end of the body than at the other end of the body.

2. A structure according to claim 1 in which the curvature at one end is approximately three times that at the other end.

3. A structure according to claim 1 in which the sharper of said curvatures has a radius of about three times the length of the body.

4. A structure according to claim 1 in which the flatter of said curvatures has a radius of about nine times the length of the body.

* * * * *